(12) United States Patent
Calabrese et al.

(10) Patent No.: US 6,513,182 B1
(45) Date of Patent: Feb. 4, 2003

(54) TOOTHBRUSH

(75) Inventors: Giuseppe Calabrese, Bebington (GB); Nicola Conte, Milan (IT); Allesandro Manfredi, Milan (IT)

(73) Assignee: Unilever Home & Personal Care USA, division of Conopco, Inc., Greenwich, CT (US)

( * ) Notice: Subject to any disclaimer, the term of this patent is extended or adjusted under 35 U.S.C. 154(b) by 54 days.

(21) Appl. No.: 09/663,761

(22) Filed: Sep. 18, 2000

(30) Foreign Application Priority Data

Sep. 17, 1999 (EP) ............................... 99203036

(51) Int. Cl.⁷ ............................. A46B 9/04; A46B 9/06
(52) U.S. Cl. ....................................... 15/110; 15/167.1
(58) Field of Search .................... 15/22.1, 23, 110, 15/167.1

(56) References Cited

U.S. PATENT DOCUMENTS

| | | | |
|---|---|---|---|
| 1,128,139 A | | 2/1915 | Hoffman |
| 1,598,224 A | * | 8/1926 | Van Sant |
| 2,117,174 A | * | 5/1938 | Jones |
| 2,702,914 A | | 3/1955 | Kittle et al. |
| 2,987,742 A | | 6/1961 | Kittle et al. |
| 3,103,027 A | * | 9/1963 | Birch |
| 3,230,562 A | * | 1/1966 | Birch |
| 3,261,354 A | * | 7/1966 | Shpuntoff |
| 4,827,551 A | * | 5/1989 | Maser |
| 5,335,389 A | | 8/1994 | Curtis et al. |
| 5,341,537 A | | 8/1994 | Curtis et al. |
| 5,628,082 A | | 5/1997 | Moskovich |
| D380,302 S | | 7/1997 | Volpenhein |
| 5,799,353 A | | 9/1998 | Oishi et al. |
| 5,802,656 A | | 9/1998 | Dawson et al. |
| D402,116 S | | 12/1998 | Magloff et al. |
| D403,510 S | | 1/1999 | Menke et al. |
| 5,930,860 A | | 8/1999 | Shipp |
| 5,991,959 A | | 11/1999 | Raven et al. |
| 6,041,467 A | * | 3/2000 | Roberts |
| D422,143 S | | 4/2000 | Beals et al. |
| D424,808 S | | 5/2000 | Beals et al. |
| 425,306 A | | 5/2000 | Beals et al. |
| 6,276,021 B1 | | 8/2001 | Holbein |
| 6,319,332 B1 | | 11/2001 | Gavney, Jr. et al. |

FOREIGN PATENT DOCUMENTS

| | | |
|---|---|---|
| FR | 2 636 818 | 9/1988 |
| GB | 2 040 161 | 1/1979 |
| WO | 96/20654 | 7/1996 |
| WO | 96/28994 | 9/1996 |
| WO | 98/18364 | 5/1998 |
| WO | 98/22000 | 5/1998 |

\* cited by examiner

Primary Examiner—Randall E. Chin
(74) Attorney, Agent, or Firm—Milton L. Honig

(57) ABSTRACT

Toothbrush comprises a handle and a head, said head comprising upstanding bristles and at least one upstanding tooth polishing element, characterised in that the tooth polishing element is in the form of a resilient wall-like member and is flanked by bristles.

9 Claims, 3 Drawing Sheets

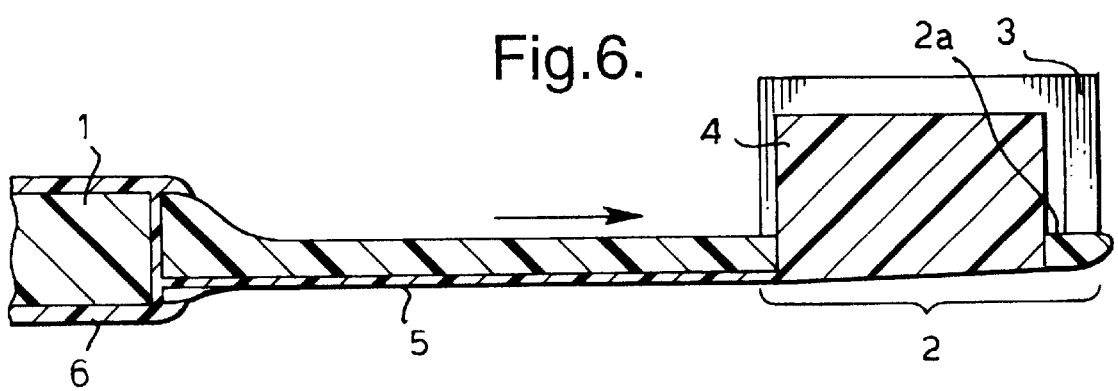
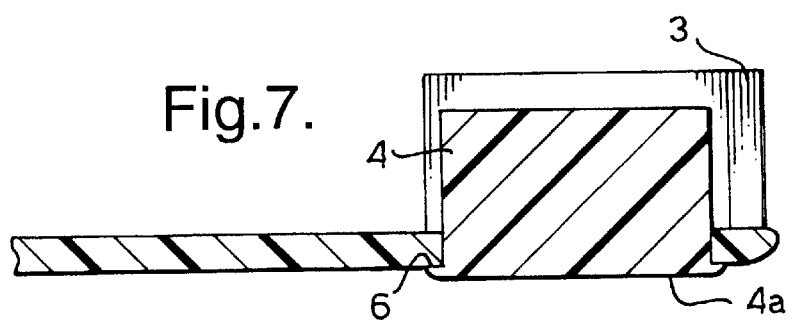
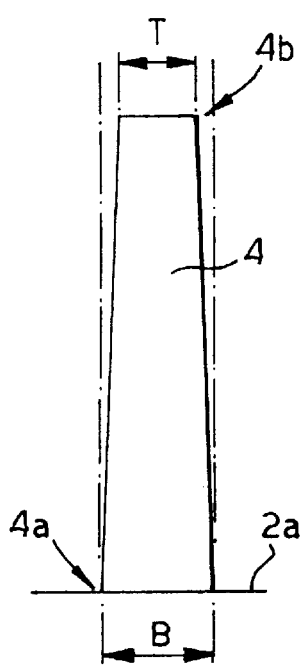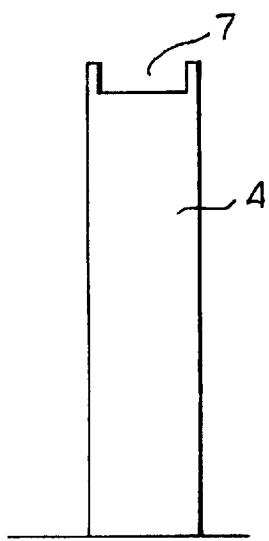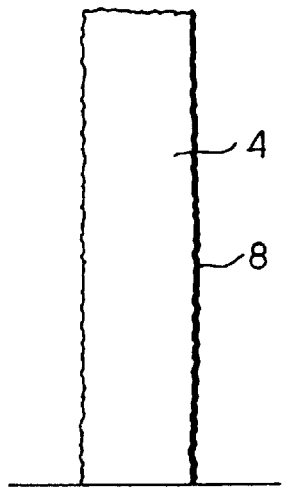

TOOTHBRUSH

BACKGROUND OF THE INVENTION

1. Field of the Invention

The present invention relates to a toothbrush having a tooth polishing element.

2. The Related Art

Toothbrushes which aim to provide a benefit in addition to cleaning are known in the art. In particular, toothbrushes which aim to provide a tooth-whitening, polishing or gum massaging effect are well-known.

WO 98/18364 (P&G) describes a toothbrush with combination of bristles, soft cleansing pad and/or polishing fingers. The polishing fingers are preferably made of a thermoplastic elastomer and the soft polishing pad is an absorbent pad capable of providing an improved cleaning benefit.

GB-A-2 040 161 (Vowles) describes an improved toothbrush comprising, in addition to conventional bristles tufts, a gum massaging member located outermost on opposite sides of the brushing surface.

WO 98/22000 (Asher) discloses a toothbrush comprising a plaque removing member being formed from a mixture of relatively soft elastomeric material and particles of an abrasive material.

Despite the presence of such brushes in the prior art there is still a need for a brush which is capable of providing an improved tooth polishing benefit and is still capable of cleaning the teeth effectively.

SUMMARY OF THE INVENTION

Accordingly, the invention provides a toothbrush comprising a handle and a head, said head comprising upstanding bristles and at least one upstanding tooth polishing element, characterised in that the tooth polishing element is in the form of a substantially resilient wall-like member and is flanked by bristles.

BRIEF DESCRIPTION OF THE DRAWING

The invention can be best understood with reference to the drawings in which:

FIG. 6 is a cross-sectional view of a brush according to the present invention;

FIG. 7 is a cross-sectional view of another brush according to the present invention; and FIGS. 8 through 10 illustrate wall-like members of three different embodiments.

DETAILED DESCRIPTION OF THE INVENTION

Figure 1A:
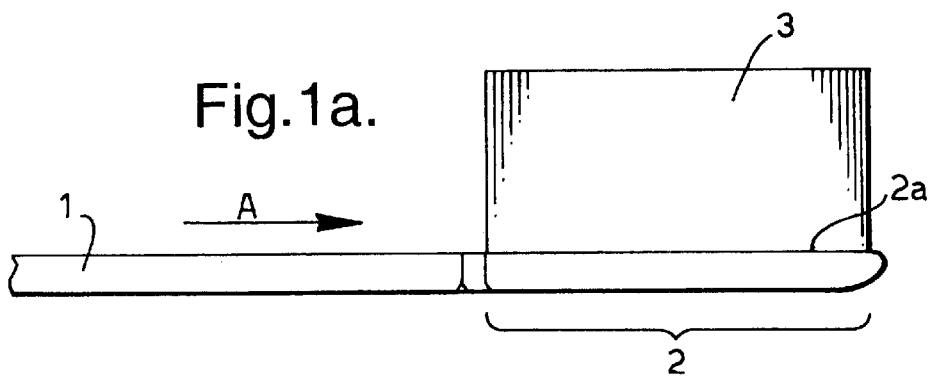
FIGS. 1a–1d is a first embodiment shown from several views.

Preferably the toothbrush is a manual toothbrush and not an electric toothbrush.

It is an essential feature of the invention that the wall-like member runs for a substantial distance and is not a mere rubber finger or flap, arcuate or otherwise.

The wall-like member is preferably made from a material soft enough to provide a polishing benefit to the teeth and so it is preferred that it is made from a material with Shore A hardness of between 5 and 80, preferably from 15 to 50.

The wall-like member provides a polishing benefit as it is rubbed along the surface of the tooth during brushing. Due to its wall-like structure and its resilient composition it is capable of being elastically deformed and this helps provide the polishing benefit. A notable distinction from brushes in the prior art is that the polishing element runs for a substantial distance along the brush head. This means that the element can be resilient enough to not feel uncomfortable to the user, i.e. too hard, and yet is not so deformable as to be merely moved to one side during brushing as would happen if it were a rubber finger. It is preferred that the wall-like member runs for a substantial distance along the brush head and, preferably, for a distance of at least half the length of the head, preferably at least three-quarters and especially at least the whole length of the head.

Where the wall-like member runs for a distance greater than the length of the head, i.e. the running length is greater than the length of the head it is necessary for it to be curved in some fashion. This may be a gentle curve but it may also be curved in a snake-like or generally sinusoidal fashion, i.e. it changes direction several times along its length.

The running length should not be confused with the straight-line length which is the shortest distance between either end of the wall-like member. Further, the running length and length of the head are measured along the junction between the wall-like member and the head.

In a particularly preferred embodiment the wall-like member runs an exaggerated meandering path along the brush head so as to provide the polishing benefit when the brush is rubbed along the teeth in any direction.

In an alternative embodiment the wall-like member is tapered away from the brush head, i.e. it is thicker in cross-section at its base than it is at its tip. This helps to amplify the elasticity of the wall-like member and improve the tooth polishing capability.

Typically the wall-like member will be between 10 and 40 mm in length and will extend from the head by from 6 to 14 mm, preferably from 8 to 12 mm.

It is envisaged that the wall-like member can be made by any conventional method, i.e. die-cut or moulded. However, a preferred method of making such a structure would be by injection moulding. The material of the wall-like member may be linked to the head of the toothbrush in any way whether it be by chemical means, mechanical means or both.

In one embodiment the material of the wall-like member is chemically compatible with the material of the head and they may be joined by application of heat, e.g. during injection moulding of one or the other.

In another embodiment the materials may be chemically incompatible, e.g. the wall-like member comprising a thermoplastic elastomer such as TPE and the brush head comprising polypropylene. It may, therefore, be more suitable to use an adhesive or to mechanically attach the two parts to one another. An alternative method of attaching the wall-like member comprising TPE to a head comprising polypropylene would be to increase the surface area of the area of attachment, e.g. by corrugating one or both, and then fixing the two together by welding or otherwise.

In a preferred embodiment the wall-like member is attached to the head through an aperture in the head which corresponds to the cross-sectional shape of the wall-like member, the member being injection moulded into the aperture.

It may also be that the wall-like member is contiguous with another portion of the brush comprising the same material and that both are filled through one or more injection points. For example, the wall-like member and a grip region on the handle are contiguous through a channel running along the head to the handle.

In a further embodiment the wall-like member is textured. Such texturing may be as a result of the inclusion of abrasive to provide an extra cleaning benefit or the wall-like member's surface may be deliberately roughened.

An alternative type of texturing can be produced by including a ridge to the wall-like member, the ridge running along at least part of the length of the wall-like member. The ridge may take any course along the wall-like member, vertical or horizontal, but, preferably, it runs along at least part of its tip.

It is an essential feature of the brush according to the invention that the wall-like member is flanked by bristles. Such flanking may be a mere scattering of bristles but it is preferred that the bristles are located outermost on the brush head and the wall-like member is located more centrally. This is a particularly beneficial design as it allows the teeth to be cleaned while also allowing the teeth to be polished. The bristles are flexed outwardly to allow the wall-like member to contact the teeth and this further improves the cleaning efficacy of the brush. Should the wall-like member be located at the outer edges of the brush head the flexing of the bristles would compromise the polishing capability of the brush.

To further enhance the benefit described above it is preferred that the bristles are longer than the tooth polishing element. By this is meant that the bristles extend further from the head than does the wall-like member. This creates a recess in the centre of the brush head which further allows the flexing of the bristles to effect good cleaning while allowing the wall-like member to polish the teeth.

Preferably the bristles extend from 8 to 14 mm from the brush head and the wall-like member 6 to 14 mm and preferably 8 to 12 mm, so that the bristles may be the same length or shorter than the wall-like member if preferred.

In a further aspect, the present invention provides for the use of a toothbrush comprising a handle and a head, said head comprising upstanding bristles and at least one upstanding tooth polishing element, characterised in that the tooth polishing element is in the form of a resilient wall-like member and is flanked by bristles for polishing the teeth.

The present invention also provides for the use of a toothbrush comprising a handle and a head, said head comprising upstanding bristles and at least one upstanding tooth polishing element, characterised in that the tooth polishing element is in the form of a resilient wall-like member and is flanked by bristles for whitening the teeth.

In yet a further aspect the brush according to the invention provides for the use of a toothbrush comprising a handle and a head, said head comprising upstanding bristles and at least one upstanding tooth polishing element, characterised in that the tooth polishing element is in the form of a resilient wall-like member and is flanked by bristles for providing a smooth feel to the teeth.

The brush according to the invention may be made from any materials commonly used in the art.

Accordingly, the handle and head of the brush can be moulded from polyolefins such as polypropylenes and polyethylenes, polyamides such as nylons, and polyesters such as polyethylene terephthalate. Other suitable materials include polymethylmethacrylate, styrene acrylonitrate and cellulose esters, for example cellulose propionate.

The bristles of the brush may be made from a flexible material suitable for use in dental hygiene. Generally, materials suitable for the bristles are polyamides such as nylon or polyesters such as polybutylene terephthalate.

Preferably, the wall-like member is made of a polymer material, such as a block co-polymer. Preferred block copolymers include styrenes (for example styrene ethylene butadiene styrene, or styrene butadiene styrene), polyolefins (for example polypropylene/ethylene propylene diamine modified systems (i.e. synthetic rubber)), polyamides (for example polyamide (2 or polyamide 6), polyesters (for example polyester ester or polyether ester), polyurethanes (for example polyesterurethane, polyetherurethane or polyesteretherurethane).

Preferred wall-like member materials can be two phase systems, which contain an internal phase material in a continuous phase of another material. A particularly preferred example of this is the polypropylene/ethylene propylene diamine modified material described above, which is commercially available as Santroprene PPA (ex Advanced Elastomer Systems). Such two phase materials may conveniently have a continuous external thermoplastic phase, with the internal phase typically containing particles which may be in the order of 0.5–5 microns across.

Alternatively, the material which comprises the wall-like member may be surface modified by grafting on other polymers to facilitate the bonding of the elastomeric bridge to either the bristle material, or the handle material, or both.

Other methods of surface modification of one or more components are contemplated to facilitate adhesion of the wall-like member to the head. For example, compatabilizer materials can be incorporated into any one of the components of the brush to facilitate its adhesion to another component.

Alternatively, one or more components can be chemically modified by a chemical surface treatment to facilitate its adhesion to an adjacent component. Alternatively, one or more components can be modified by surface oxidation (e.g. by flaming, or by electrical discharge) to facilitate its adhesion to an adjacent component.

In a preferred embodiment, to facilitate and simplify bonding of the wall-like member to the head, the head may be made of materials which are of similar or even the same character, so that they for example have similar functional groups, similar levels of functionality, similar surface energies, and so on. Such similarity may facilitate adhesion of the respective components, and in a preferred embodiment the head and wall-like member may be made of the same materials, for example nylon materials.

Preferred wall-like member materials are thermoplastic elastomers for ease of injection moulding.

Embodiments of particular toothbrushes according to the invention will now be described in more detail with reference to the following figures.

Figure 1B:
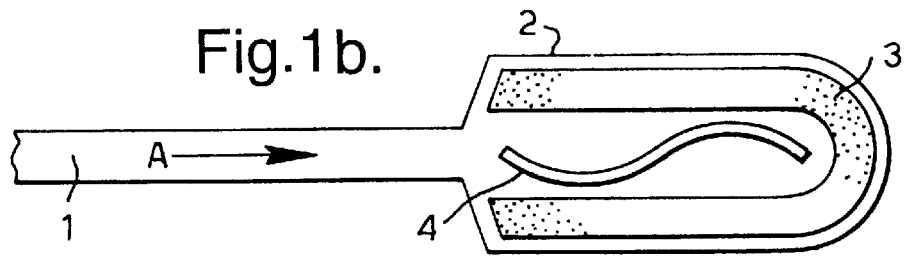
Figure 1C:
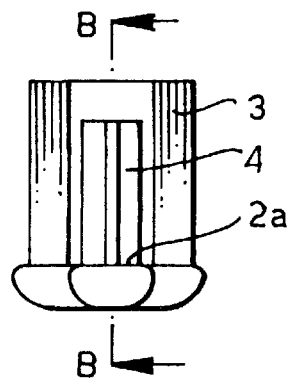
Figure 1D:
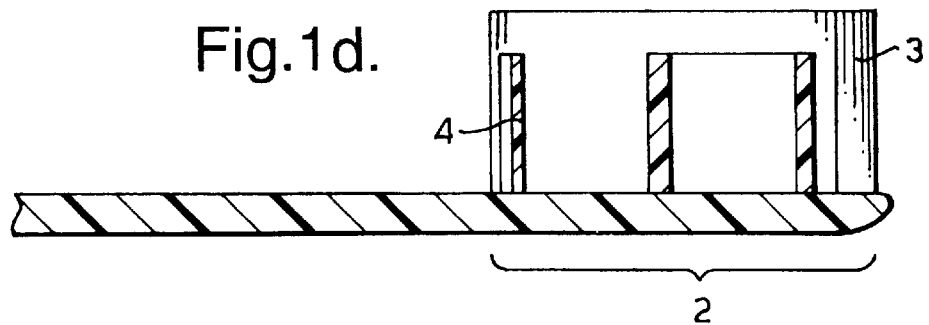

FIGS. 1a through 1d show a single brush in various views. FIG. 1a is an elevational view of the head and part of the handle of a brush according to the invention. FIG. 1b is a plan view of the brush shown in FIG. 1a. FIG. 1c is an end view of the brush shown in FIGS. 1a and 1b along direction A. FIG. 1d is a cross-sectional view along section B—B of the brush shown in FIGS. 1a to 1c.

FIGS. 2 through 5 are plan views of various brushes according to the invention.

FIGS. 6 and 7 are cross-sectional views of brushes according to the invention exemplifying the methods for attaching the wall-like member to the brush head.

FIG. 1a shows a brush comprising a handle (1) and a head (2). The head has a bristle bearing surface 2a from which extend bristles (3).

FIG. 1b shows a brush according to FIG. 1 additionally showing an upstanding polishing element in the form of a wall-like member (4). The wall-like member (4) is only seen in plan view but it clearly runs along a significant length of the head (2) and, in plan view, appears longer than the length of the head. The bristles (3) extend further from the head (2) than the wall-like member (4).

FIG. 1c shows the wall-like member (4) is attached at its base to the head (2) and is flanked at either side by the bristles (3).

FIG. 1d shows the wall-like member (4) attached at its base to the head (2) of the brush.

Figure 2:
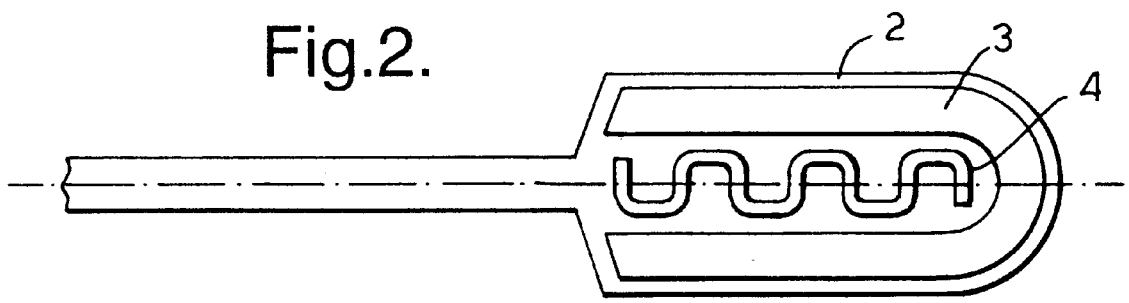
FIG. 2 is a plan view of a second embodiment.

FIG. 2 shows a brush head (2) with a wall-like member (4) and bristles (3). The wall-like member is generally sinusoidal in plan view and runs generally along a longitudinal axis (L) of the head (2).

Figure 3:
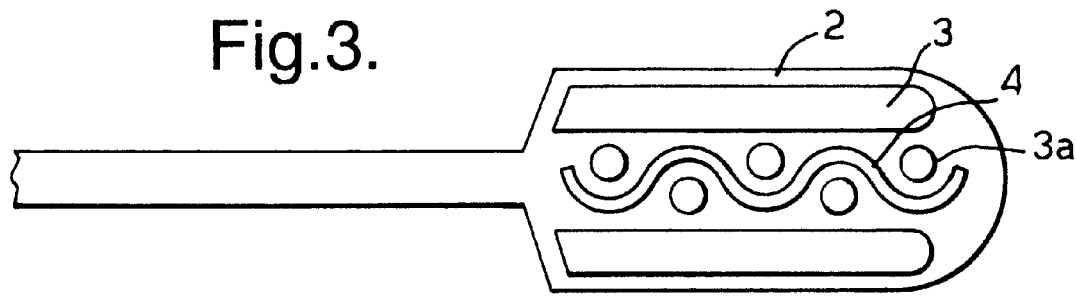
FIG. 3 is a plan view of a third embodiment.

FIG. 3 shows a brush head (2) with a wall-like member (4) and bristles (3). The brush also has further tufts of bristles (3a) located within the central area of the head near to the wall-like member (4).

Figure 4:
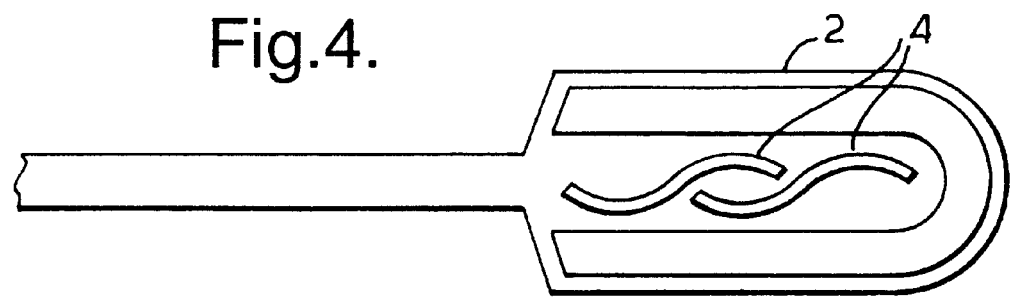
FIG. 4 is plan view of a fourth embodiment.

FIG. 4 shows a brush head (2) comprising two wall-like members, which preferably are linked through a channel allowing for one-step injection moulding.

Figure 5:
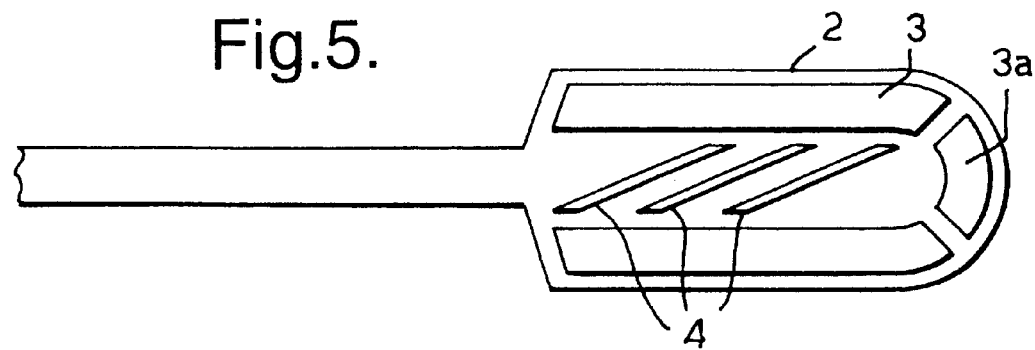
FIG. 5 is a plan view of a fifth embodiment.

FIG. 5 shows a brush head (2) comprising three wall-like members (4) which are not curved. The brush head also has a large bristle tuft (3a) located at the toe of the brush head.

FIG. 6 shows a cross-sectional view of a portion of a brush according to the invention. The figure shows a handle (1) and a head (2), bristles (3) and wall-like member (4), the latter two extending from the bristle bearing surface (2a) of the head (2). The wall-like member (4) is contiguous with a portion of the handle (6) via a channel (5) which extends along the neck between the handle and the head. It may be that the channel is visible, as would be expected with a brush according to the figure, or may be hidden. Such a configuration would allow the wall-like member and the region around the handle to be formed by injection moulding through a single injection point. Typically, the wall-like member is made from a rubbery material such as a thermoplastic elastomer, e.g. TPE and the region around the handle (6) provides an improved grip.

FIG. 7 shows an alternative method of attaching the wall-like member to the head of the brush. The wall-like member in this structure has a base portion (4a) of greater dimensions than the aperture (6) through which it passes to the surface of the head. A wall-like member such as is depicted in this figure may also be made by injection moulding.

FIG. 8 shows a wall-like structure which tapers away from the bristle-bearing surface (2a) of the brush head (2). By tapered away from the brush head is meant that the wall-like member has a base (4a) and a tip (4b) and the distance across the base (B) is greater than the distance across the tip (T).

FIG. 9 shows a wall-like member (4) with a ridge (7) running along the tip. It may or may not be that the ridge runs along the entire length of the member.

FIG. 10 shows a wall-like member (4) which has a textured surface (8). By textured is meant that the surface is rough and this may be due to the way that the member is formed or due to the inclusion of an abrasive material.

What is claimed is:

1. Toothbrush which is manually rather than electrically operated comprising a handle and a head, said head comprising upstanding bristles and at least one upstanding tooth polishing element, characterised in that the tooth polishing element is in the form of a resilient wall member orienated in a generally sinusoidal fashion along a longitudinal axis of the head, and the wall member being flanked on both sides along the longitudinal axis by said upstanding bristles.

2. Toothbrush according to claim 1, characterised in that the wall member is made of a material of Shore A hardness between 5 and 80.

3. Toothbrush according to claim 1, characterised in that the wall member is tapered away from the head.

4. Toothbrush according to claim 1, characterised in that the wall member is textured.

5. Toothbrush according to claim 1, characterised in that the wall member has at least one ridge running along at least part of the member's length.

6. Toothbrush according to claim 5, characterised in that the ridge runs along at least part of a tip of the wall member.

7. Toothbrush according to claim 1, characterised in that the wall member contains abrasive material.

8. Toothbrush according to claim 1, characterised in that the upstanding bristles are located outermost on the head.

9. Toothbrush according to claim 1, characterised in that the upstanding bristles extend further from the head than does the tooth polishing element.

* * * * *